US012624640B2

(12) United States Patent
Votie et al.

(10) Patent No.: US 12,624,640 B2
(45) Date of Patent: May 12, 2026

(54) TURBINE ENGINE ELEMENT COMPRISING AT LEAST ONE BLADE OBTAINED BY ADDITIVE MANUFACTURING

(71) Applicant: Safran Helicopter Engines, Bordes (FR)

(72) Inventors: Sylvain Pierre Votie, Moissy-Cramayel (FR); Denis Daniel Jean Boisseleau, Moissy-Cramayel (FR); Xavier Roger Betbeder-Laüque, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 18/692,557

(22) PCT Filed: Sep. 16, 2022

(86) PCT No.: PCT/FR2022/051747
§ 371 (c)(1),
(2) Date: Mar. 15, 2024

(87) PCT Pub. No.: WO2023/041880
PCT Pub. Date: Mar. 23, 2023

(65) Prior Publication Data
US 2024/0384660 A1 Nov. 21, 2024

(30) Foreign Application Priority Data

Sep. 17, 2021 (FR) ....................................... 2109800

(51) Int. Cl.
*F01D 9/06* (2006.01)
*B22F 3/11* (2006.01)
(Continued)

(52) U.S. Cl.
CPC .............. *F01D 9/065* (2013.01); *B22F 10/28* (2021.01); *B33Y 10/00* (2014.12); *B33Y 80/00* (2014.12);
(Continued)

(58) Field of Classification Search
CPC .......... B22F 5/04; B22F 3/1115; B22F 10/28; B22F 10/00; B22F 10/47; F01D 5/147;
(Continued)

(56) References Cited

U.S. PATENT DOCUMENTS 6,695,582 B2 * 2/2004 Bunker ................... F01D 5/187
416/232
8,342,797 B2 * 1/2013 Kwon ..................... F01D 5/186
415/115
(Continued)

FOREIGN PATENT DOCUMENTS

FR 3 085 713 A1 3/2020
WO WO 2020/122886 A1 6/2020
WO WO 2021/181038 A1 9/2021

OTHER PUBLICATIONS

International Preliminary Report on Patentability and Written Opinion of the International Searching Authority for International Application No. PCT/FR2022/051747, dated Mar. 5, 2024, with English translation.
(Continued)

*Primary Examiner* — Eric J Zamora Alvarez
(74) *Attorney, Agent, or Firm* — Birch, Stewart, Kolasch & Birch, LLP

(57) ABSTRACT
The present invention relates to a turbomachine element (1), comprising at least one blade (2) obtained by additive manufacturing, the blade (2) having a skin (4) and an
(Continued)

internal lattice (6) allowing air circulation in the blade (2) and having an additive manufacturing support function for the skin (4).

11 Claims, 5 Drawing Sheets

(51) Int. Cl.
| | |
|---|---|
| *B22F 10/28* | (2021.01) |
| *B33Y 10/00* | (2015.01) |
| *B33Y 80/00* | (2015.01) |
| *F01D 5/18* | (2006.01) |
| *F01D 9/04* | (2006.01) |
| *F01D 25/12* | (2006.01) |

(52) U.S. Cl.
CPC ............. *F01D 9/041* (2013.01); *F01D 25/12* (2013.01); *B22F 2998/10* (2013.01); *F05D 2220/323* (2013.01); *F05D 2230/31* (2013.01); *F05D 2240/12* (2013.01); *F05D 2260/20* (2013.01)

(58) Field of Classification Search
CPC .......... F01D 5/187; F01D 5/18; F01D 25/005; F01D 25/04; F01D 5/189; F01D 9/02; F01D 9/041; F01D 9/065; F01D 5/26; F01D 25/02; F01D 25/12; F01D 5/282; F05D 2250/28; F05D 2230/31; F05D 2260/96; F05D 2300/60; F05D 2220/32; F05D 2240/11; F05D 2240/12; F05D 2240/30; F05D 2250/283; F05D 2250/282; F05D 2300/612; F05D 2250/75; F05D 2250/291; F05D 2260/20; F05D 2260/201; F05D 2260/2212; F05D 2260/2214; F05D 2300/514; F04D 29/30; F04D 29/023; F04D 29/325; F04D 29/388; B33Y 80/00

See application file for complete search history.

(56) References Cited

U.S. PATENT DOCUMENTS

| | | | | |
|---|---|---|---|---|
| 11,808,179 | B2 * | 11/2023 | Vial | ......................... B22F 5/009 |
| 11,814,973 | B2 * | 11/2023 | Zheng | .................... F01D 5/189 |
| 12,055,065 | B1 * | 8/2024 | Kommareddy | ........... F01D 9/02 |
| 2013/0276461 | A1 * | 10/2013 | Propheter-Hinckley | .................... F04D 29/388 416/227 R |
| 2016/0115822 | A1 * | 4/2016 | Cortequisse | .............. B22F 7/08 415/200 |
| 2018/0187984 | A1 | 7/2018 | Manzo | |
| 2019/0017388 | A1 * | 1/2019 | El-Wardany | ........... F01D 5/147 |
| 2020/0080611 | A1 | 3/2020 | Blank et al. | |
| 2021/0372286 | A1 * | 12/2021 | Chakrabarti | ......... B22F 3/1115 |
| 2021/0396179 | A1 * | 12/2021 | Balandier | ................ F01D 5/28 |

OTHER PUBLICATIONS

International Search Report for International Application No. PCT/FR2022/051747, dated Jan. 23, 2023, with English translation.

* cited by examiner

PRIOR ART
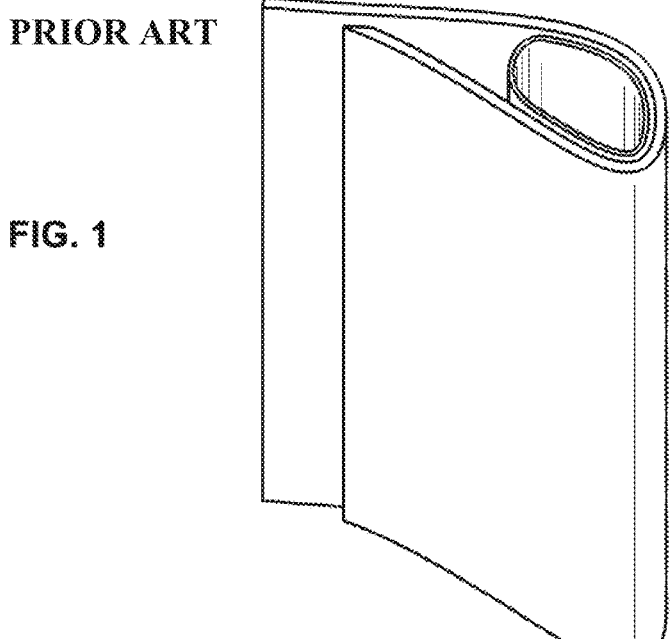
FIG. 1
PRIOR ART
FIG. 2
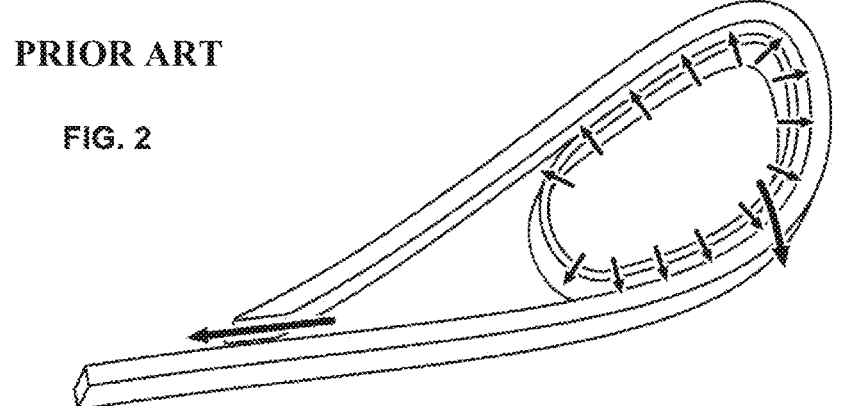

TURBINE ENGINE ELEMENT COMPRISING AT LEAST ONE BLADE OBTAINED BY ADDITIVE MANUFACTURING

FIELD OF THE INVENTION

The present invention relates to the field of turbine engines and, more particularly, to cooling systems of turbine engine elements.

Prior Art

The parts inside a turbine engine are subjected to very high thermal stresses. In order to prevent certain elements from breaking or wearing out prematurely, it is necessary to cool them during the operation of the turbine engine.

This is particularly the case for high-pressure nozzles, inlet guide vanes and variable stator vanes.

Currently, several methods are known for cooling these elements, including:

added multiply-pierced insert (impact): with this technology (shown in FIGS. 1 and 2), the ventilating air is guided at high-speed by the piercings (impact holes produced in an insert) onto the part to be ventilated.

Internal coil type circuit: with this technology (shown in FIG. 3), the ventilating air is guided through the part to be cooled in order to produce a convective heat exchange. It is discharged into the main duct (hot gas) via vents.

Disruptors (bridges/fins): with this technology (shown in FIG. 4), the path of the ventilating air may be partially obstructed by disruptors in order to produce local heat exchange between the disruptors and the ventilating air (+acceleration of the air in order to increase convective heat exchange). These disruptors can also be used to thermally connect the pressure side and suction side of a blade.

In addition, it is known from document FR3085713 to incorporate cooling capillaries in a vane (or a blade). These capillaries pass through the vane and thus enable air circulation through the vane.

This system enables efficient cooling but is not optimal in the case of producing the element (vane, blade or nozzle) by additive manufacturing.

More specifically, since a vane (or blade) may be a hollow part, during its production by additive manufacturing, it may be necessary to incorporate a manufacturing support in the vane. As a function of the direction of manufacture, the support can support the material deposited, for example in order to produce one of the outer faces of the vane.

However, for many elements of a turbine engine, additive manufacturing by laser powder bed fusion imposes a direction of manufacture along the axis of the turbine. In this context, a hollowed out blade with many deflections cannot be produced in a single piece without supports. It is therefore essential to add manufacturing supports in the blade. However, these supports, which are not initially provided, can interfere with the capillaries, and potentially degrade the intrinsic performance of the part. Moreover, certain unsupported capillaries may be obstructed and inaccessible at the end of the additive manufacturing method.

In this context, it is necessary to supply a turbine engine element comprising a blade having a structure that is suitable to be cooled and to be produced by additive manufacturing.

DISCLOSURE OF THE INVENTION

According to a first aspect, the invention proposes a turbine engine element, comprising at least one blade obtained by additive manufacturing, the blade having a skin and an internal lattice allowing air circulation in the blade and having an additive manufacturing support function for the skin.

The lattice can have a variable density.

The lattice can have a higher density close to the skin.

The blade can have at least one insert positioned in the lattice.

The insert can have at least one opening allowing air circulation towards the skin.

The lattice can comprise an inner portion and an outer portion, separated by the insert.

The element can have two circumferential duct walls between which said at least one blade extends in a direction radial to a main axis of the turbine engine, the skin forming two tangential walls of said at least one blade.

The blade can have openings extending in a plane perpendicular to the radial direction.

The blade may not have a wall extending in a plane perpendicular to the radial direction.

The element can be chosen from a high-pressure nozzle, an inlet guide vane and a variable stator vane.

According to a second aspect, the invention proposes an aircraft turbine engine, the turbine engine comprising an element according to the first aspect.

According to a third aspect, the invention proposes an aircraft comprising a turbine engine according to the second aspect.

According to a fourth aspect, the invention proposes a method for manufacturing a turbine engine element according to the first aspect, the method comprising additive manufacturing of a skin of a blade of the element using a lattice as support, the lattice extending in the blade at the end of manufacturing.

DESCRIPTION OF THE FIGURES

Other features, aims and advantages of the invention will emerge from the following description, which is given purely by way of illustration and not being limiting and which should be read with reference to the attached drawings, in which:

FIG. 1 is a representation of a device of the prior art.

FIG. 2 is a representation of a device of the prior art.

DETAILED DESCRIPTION OF THE INVENTION

Context of a Turbine Engine

Figure 3:
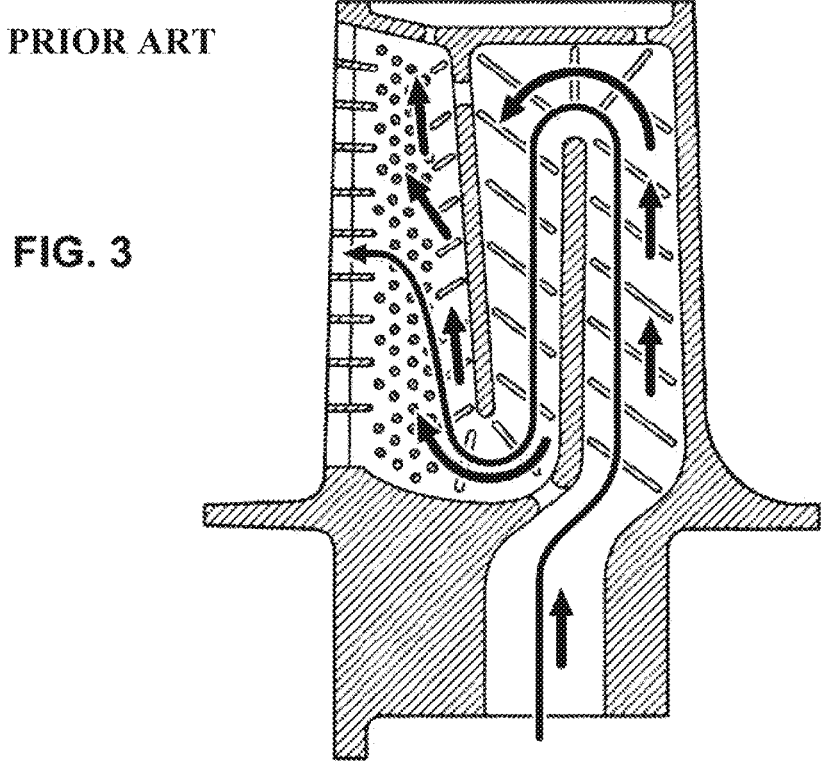
FIG. 3 is a representation of a device of the prior art.
Figure 4:
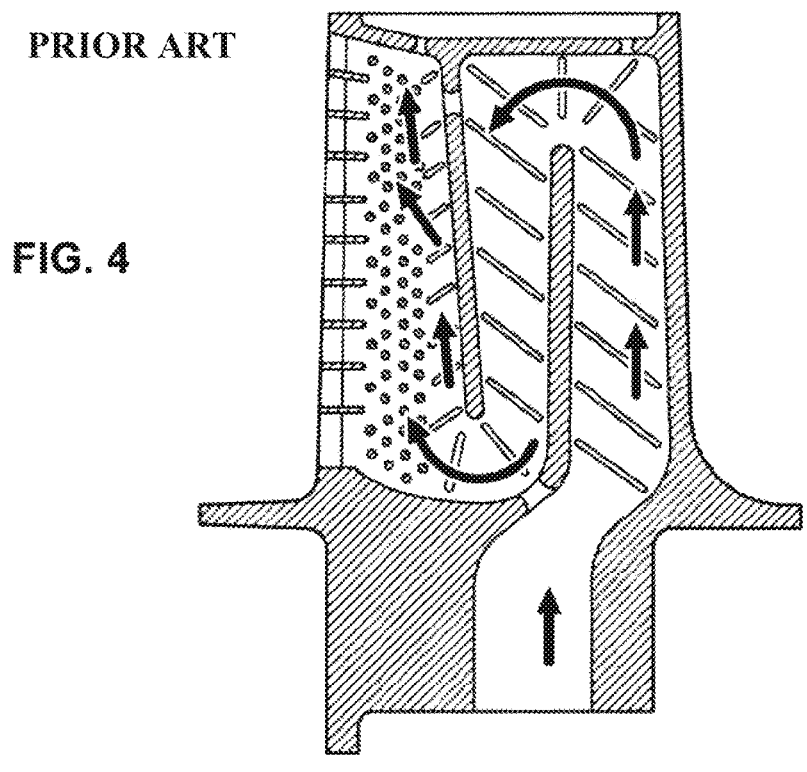
FIG. 4 is a representation of a device of the prior art.

According to a first aspect, the invention proposes a turbine engine element 1 comprising at least one blade 2 obtained by additive manufacturing.

The turbine engine can be, for example, an aircraft turbofan engine which is well known to a person skilled in the art, conventionally comprising a fan, a compressor, a combustion chamber, a high-pressure turbine and a low-pressure turbine. In the case of turbofan engines, the fan has large dimensions compared with other components, and the flow of air passing through, in particular, the combustion chamber and the high-pressure and low-pressure turbines, is a small portion of the total airflow passing through the fan. A part of the airflow passing through the fan is therefore directly expelled, whereas another part passes through the compressor, the combustion chamber and the high-pressure and low-pressure turbines.

Blade

As indicated above, the invention relates to an element 1 comprising a blade 2. Typically, the blade 2 has a skin 4 and a lattice 6. It is specified that under conditions of use, the blade 2 is intended to be cooled by air or a gas which is colder than the hot gases circulating in a duct of the turbine engine.

The skin 4 is an outer envelope of the blade 2. Conventionally, the blade 2 has a geometry with a leading edge 7, a trailing edge 8, a pressure sides 10 and a suction side 12. As described below, the blade 2 according to the invention is preferably manufactured according to an additive manufacturing method.

Thus, all of the elements constituting the blade 2 (the skin, the lattice and the insert which will be described below) are produced by additive manufacturing and are connected to one another so as to form a single, same one-piece part.

In other words, the blade 2 manufactured by additive manufacturing does not consist of a plurality of assembled parts, but is a one-piece part comprising a plurality of elements.

In particular, the blade 2 comprises an inner lattice 6 connected to the skin 4. The lattice 6 can support the skin 4 in order to guarantee the mechanical strength of the blade 2.

In addition, as will be described below, the lattice 6 enables air circulation in the blade 2 and provides a support function for additive manufacturing of the skin 4. This double function of the lattice 6 is a particularly advantageous technical feature of the invention. Indeed, the lattice 6 is an economical manufacturing support because it has empty regions and therefore requires less material for its manufacture than a solid element. In addition, the use of a lattice 6 as a structural frame for the blade 2 makes it possible to both guarantee the mechanical strength of the blade while allowing optimum internal cooling.

Indeed, the lattice 6 has numerous empty regions 14, where the air can circulate satisfactorily in the lattice.

The term "lattice" 6 shall mean a lattice structure, in other words an architectural structure composed of a material and empty regions. In other words, the lattice is a mesh of material (typically a metal alloy) consisting of a network of solid structures 16 (for example made of metal alloy) and empty regions 14 between the structures. Empty region 14, shall mean regions without solid material consolidated by additive manufacturing. More precisely, powder is deposited in these empty regions 14 during manufacture. However, this powder is not fused, and is then removed at the end of manufacture. Typically the empty regions 14 are filled with a gas comprising the atmosphere in which the lattice 6 is located. Typically, during the manufacture, the empty regions 14 can be filled with a neutral gas or ambient terrestrial air (i.e. a mixture of gases composed essentially of nitrogen, carbon dioxide and molecular oxygen). The term "network of solid structures" 16 shall mean a repetition of an elementary mesh in the three spatial dimensions forming a grid, the elementary mesh being of any geometry and comprising a closed pattern.

Advantageously, the lattice 6 can have a variable density. The term "variable density" shall mean that the quantity of material and the dimensions of the mesh vary in the lattice. Thus, a region of higher density is a region in which (compared to the remainder of the lattice) there is a higher concentration of solid structures 16 and a lower concentration of empty regions 14. Conversely, a region of lower density is a region in which (compared to the remainder of the lattice) there is a lower concentration of solid structures 16 and a higher concentration of empty regions. In other words, in a lower density region (compared to the remainder of the lattice), the volume of an empty region is greater than the volume of an empty region in a higher density region.

According to a particularly advantageous embodiment, the lattice 6 can have a higher density close to the skin 4. This embodiment can guarantee optimum air circulation in the blade, while offering optimum mechanical support to the skin and participating in the heat exchange.

Insert

According to a particularly advantageous embodiment, the blade can comprise an insert 20 positioned in the lattice 6.

Figure 7:
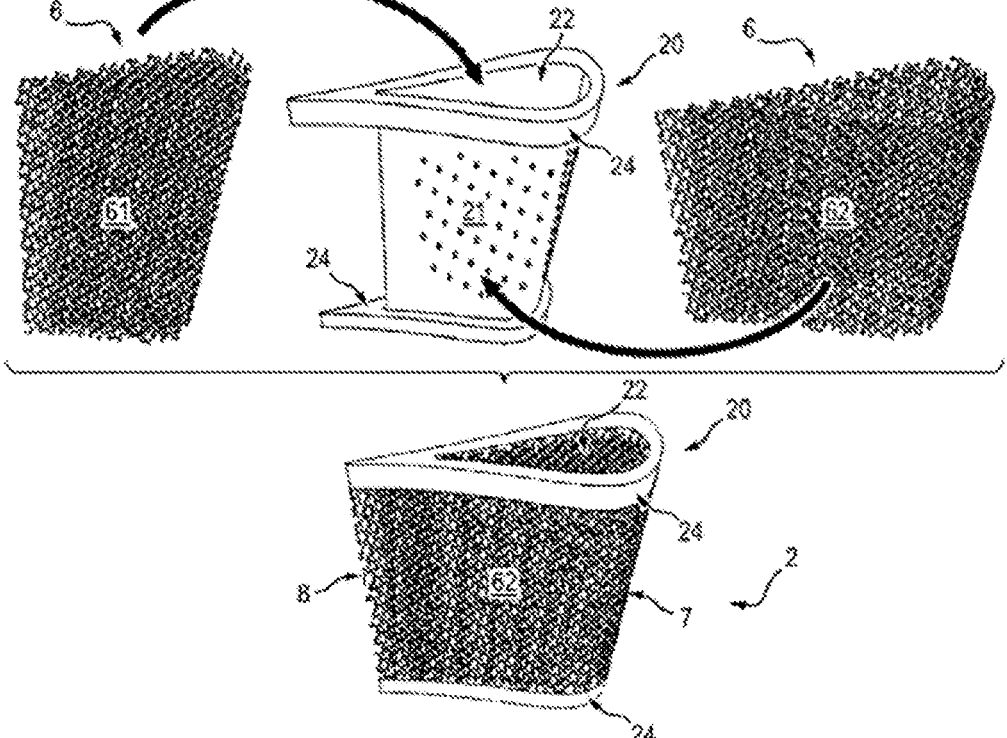
FIG. 7 is an exploded representation of a blade according to the invention.

With reference to FIG. 7, the insert 20 can be a massive element (in contrast to the lattice). The term "massive element" shall mean that the insert 20 has solid walls made of solid material (with the exception of openings produced in the insert as will be described below).

Typically, the insert 20 has a geometry similar to the geometry of the blade 2. Thus, the insert 20 has the geometry of a wing with the leading edge, a trailing edge, a pressure side and a suction side. The insert has a hollow radial section and defines an inner volume 22.

As previously indicated, the insert 20 can have at least one opening 21 allowing air circulation towards the skin. Preferably, the insert 20 has a plurality of openings 21. The openings 21 passing through the wall of the insert can allow a circulation of air from the inner volume towards the outside.

The insert 20 is manufactured and positioned in the lattice 6, so that it divides the lattice 6 into an inner portion 61 positioned inside the insert 6 and an outer portion 62 located outside the insert 20. It is specified that, in FIG. 7, the insert 20 and the lattice 6 are represented separated. However, this is an exploded representation, uniquely allowing each element to be observed separately. Indeed, the lattice 6 and the insert 20 are manufactured at the same time and are connected so as to form a single and same part (with the skin 4 as well).

Figure 8:
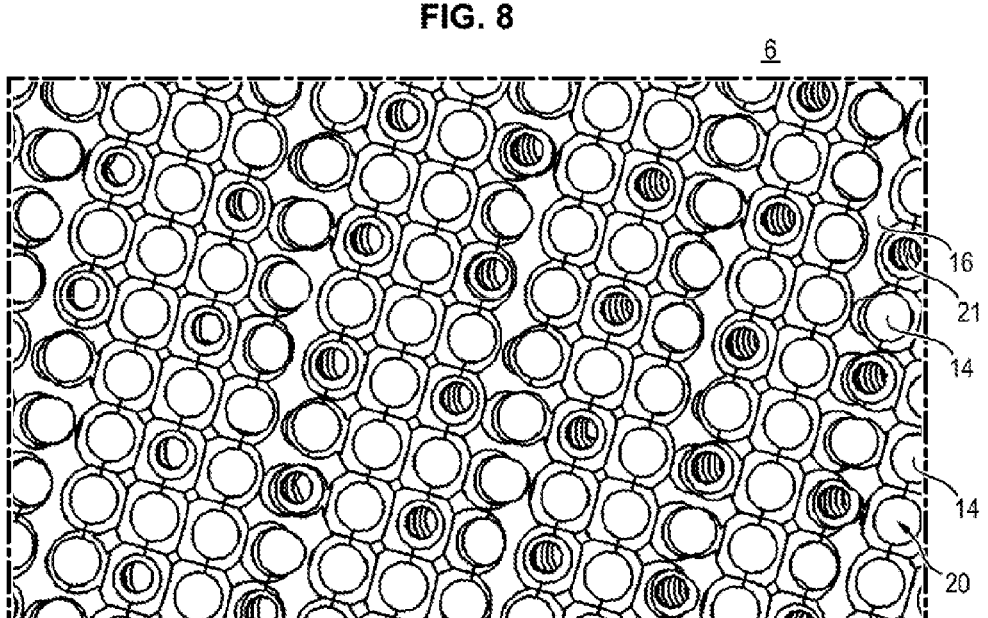
FIG. 8 is an enlarged representation of a portion of a blade according to the invention.
Figure 9:
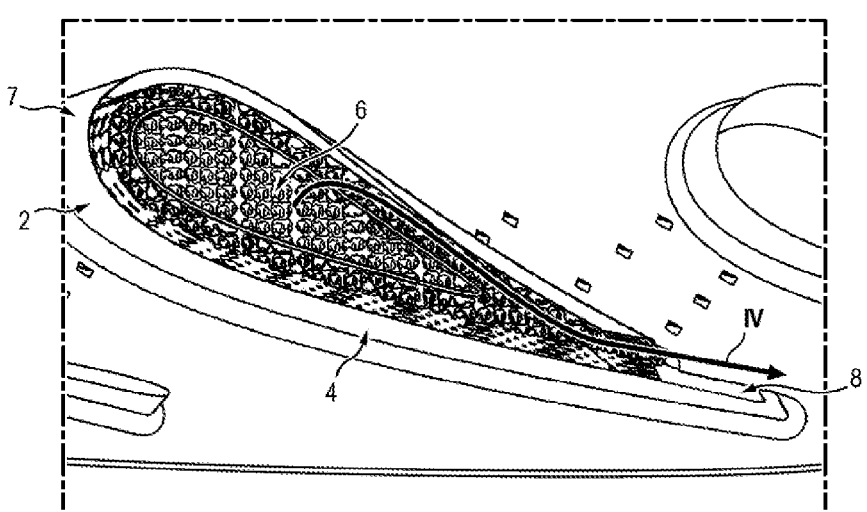
FIG. 9 is a sectional representation, in a substantially circumferential plane, of a portion of a blade according to the invention.

As shown in FIG. 8, the openings 21 of the insert 20 are positioned so as to open out into the empty regions 14 of the lattice 6, in order to allow the most optimum possible air circulation.

In addition, the element can have two circumferential duct walls 24, between which said at least one blade extends in a direction radial to a main axis of the turbine engine, this direction corresponding to the direction of the height of the blade, the skin forming two tangential walls of said at least one blade.

These duct walls each define a radial opening. Thus, the blade has openings extending in a plane perpendicular to the direction radial to the axis.

Unless specified otherwise, inner (respectively, interior) and outer (respectively, exterior), respectively, are used with reference to a radial direction such that the inner part or face of an element is closer to the main axis than the outer part or face of the same element.

The duct walls 24 act as radial stops framing the lattice. Thus, in other words, the blade is hollow in the radial direction and cannot have a wall extending in a plane perpendicular to the radial direction.

According to a particularly advantageous embodiment, the blade 2 does not have a wall in a plane perpendicular to the radial direction. Thus, the air can enter into the blade 2 by one and/or the other of the two radially inner and outer duct walls 24 of the blade 2 and circulate there via the lattice 6 and the openings 21 of the insert (as represented by the arrow IV), in order to cool the skin.

Typically, the element is chosen from a high-pressure nozzle, an inlet guide vane and a variable stator vane.

Manufacturing Method

According to a second aspect, the invention relates to a method for additive manufacturing of an element according to the invention.

Typically, the additive manufacturing method is a laser powder bed fusion method (also called LBM Laser Beam Melting or SLM Selective Laser Melting). This is a raw material processing method which is part of the family of additive manufacturing methods.

Figure 5:
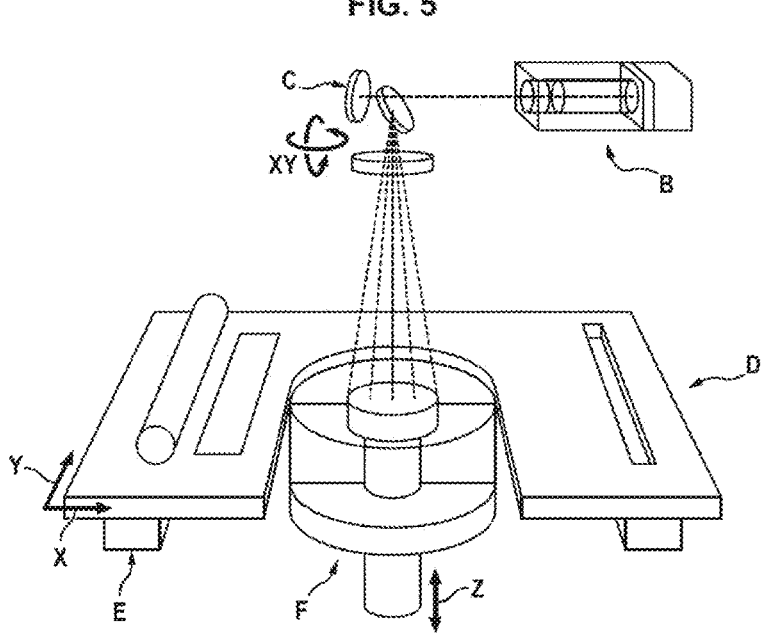
FIG. 5 is a representation of a known additive manufacturing device.
Figure 6:
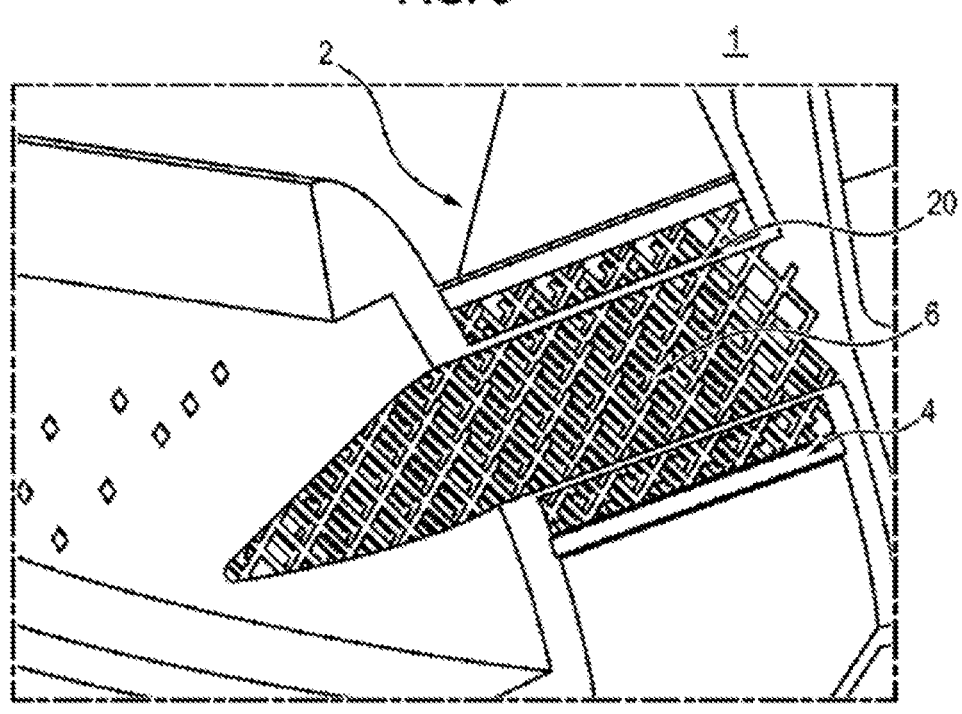
FIG. 6 is a representation in radial section, substantially perpendicular to the flow intended to flow around the blade, of a blade according to the invention.

In a known manner, an LBM method uses an additive manufacturing machine A (shown in FIG. 5) incorporating a laser B, a mirror C, a scraper D, a powder tank E and a manufacturing plate F.

The LBM method proceeds in various steps which are repeated until the final object is obtained:

A layer of metal powder is spread using a scraper on the manufacturing plate.

The powder is locally fused by a laser.

The manufacturing plate descends by the thickness of one layer.

A new layer of metal powder is spread and so on.

As previously indicated, with this method, the various component members (skin, lattice and insert) are simultaneously manufactured, layer-by-layer, in order to form just one single-piece part.

During the manufacturing method, the lattice can support the skin and the insert. Thus, as previously explained, the lattice has a double function of support during manufacture and as a mechanical structure contributing to the strength and to the cooling of the element.

Turbine Engine

According to another aspect, the invention relates to a turbine engine comprising a control assembly 10.

Aircraft

According to another aspect, the invention relates to an aircraft comprising at least one turbine engine.

The invention claimed is:

1. A turbine engine element,
the turbine engine element comprising at least one blade obtained by additive manufacturing, the at least one blade comprising:
     a skin; and
     an internal lattice comprising a mesh formed by a network of solid structures and empty regions connected together and arranged in a closed pattern to form a grid,
the lattice being configured for allowing air circulation in the blade and for supporting the skin during the additive manufacturing, wherein
     the at least one blade further comprises at least one insert positioned in the lattice, and
     the lattice further comprises an inner portion and an outer portion, separated by the insert.

2. The turbine engine element according to claim 1, wherein the lattice comprises a variable density.

3. The turbine engine element according to claim 2, wherein the density is higher close to the skin.

4. The turbine engine element according to claim 1, wherein the at least one insert further comprises at least one opening configured for allowing air circulation towards the skin.

5. The turbine engine element according to claim 1, further comprising two circumferential duct walls, wherein the at least one blade extends in a radial direction between the two circumferential duct walls, the radial direction being perpendicular to a main axis of a turbine engine and intersecting the main axis, the skin forming two tangential walls of the at least one blade.

6. The turbine engine element according to claim 5, wherein the blade further comprises two openings, each opening extending in a plane perpendicular to the radial direction.

7. The turbine engine element according to claim 6, wherein the blade does not have a wall extending in a plane perpendicular to the radial direction.

8. The turbine engine element according to claim 1, wherein the turbine engine element being at least one of:
     a high-pressure nozzle;
     an inlet guide vane; and
     a variable stator vane.

9. An aircraft turbine engine,
the aircraft turbine engine comprising a plurality of turbine engine elements according to claim 1.

10. An aircraft,
the aircraft comprising the aircraft turbine engine according to claim 9.

11. A method for manufacturing the turbine engine element according to claim 1, the method comprising the additive manufacturing of the skin and the lattice of the least one blade of the turbine engine element, the lattice supporting the skin during the additive manufacturing, the method being performed so that the lattice extends in the at least one blade at the end of the additive manufacturing.

\*    \*    \*    \*    \*